(12) United States Patent
Baser (10) Patent No.: US 11,884,030 B2
(45) Date of Patent: Jan. 30, 2024

(54) METHOD OF MANUFACTURING A LIGHTWEIGHT, STRUCTURALLY REINFORCED OBJECT OF THERMOPLASTIC MATERIAL

(71) Applicant: MITSUBISHI CHEMICAL ADVANCED MATERIALS AG, Lenzburg (CH)

(72) Inventor: Burak Baser, Aarburg (CH)

(73) Assignee: Mitsubishi Chemical Advanced Materials AG, Lenzburg (CH)

( * ) Notice: Subject to any disclaimer, the term of this patent is extended or adjusted under 35 U.S.C. 154(b) by 0 days.

(21) Appl. No.: 17/761,080

(22) PCT Filed: Sep. 16, 2020

(86) PCT No.: PCT/EP2020/075819
§ 371 (c)(1),
(2) Date: Mar. 16, 2022

(87) PCT Pub. No.: WO2021/052988
PCT Pub. Date: Mar. 25, 2021

(65) Prior Publication Data
US 2022/0371290 A1    Nov. 24, 2022

(30) Foreign Application Priority Data
Sep. 16, 2019    (EP) .................................... 19197629

(51) Int. Cl.
*B29C 70/46* (2006.01)
*B29C 70/12* (2006.01)
(Continued)

(52) U.S. Cl.
CPC .............. *B29C 70/46* (2013.01); *B29C 70/12* (2013.01); *B29C 70/68* (2013.01);
(Continued)

(58) Field of Classification Search
CPC ......... B29C 70/46; B29C 70/12; B29C 70/68; B29C 44/06; B29C 44/3496;
(Continued)

(56) References Cited

U.S. PATENT DOCUMENTS 4,670,331 A * 6/1987 Radvan ................... B29C 70/56
428/297.4
2014/0030491 A1 * 1/2014 Sakai .................... B29C 70/085
428/196

FOREIGN PATENT DOCUMENTS

EP         0148763 A2    7/1985
WO    2006105682 A1    10/2006
(Continued)

OTHER PUBLICATIONS

International Search Report, PCT/EP2020/075819, dated Dec. 15, 2020.

*Primary Examiner* — Brian Handville
(74) *Attorney, Agent, or Firm* — BROOKS KUSHMAN P.C.

(57) ABSTRACT

Lightweight, structurally reinforced thermoplastic objects comprising at least one reinforcement zone are manufactured by providing a heatable rigid forming chamber with a chamber volume. At a temperature below the thermoplastic softening temperature, the chamber is loaded with a plurality of thermoplastic lofting bodies and a plurality of thermoplastic reinforcement bodies wherein the lofting bodies are heat-loftable bodies comprising a thermoplastic matrix containing an elastically compressed assembly of reinforcement fibers embedded therein, lofty non-woven bodies comprising an elastically compressible assembly of reinforcement fibers and thermoplastic fibers. Upon closing the chamber, lofting bodies of lofty non-wovens are elastically compressed, producing an internal pressure. After heating the chamber above softening temperature, reinforcement bodies (Continued)

and lofting bodies are ow thermoplastically formable, and lofting bodies configured as heat-loftable bodies produce a second internal pressure. After a predetermined processing time, the chamber is cooled yielding a structurally reinforced object.

16 Claims, 4 Drawing Sheets

(51) Int. Cl.
    *B29C 70/68*     (2006.01)
    *B29K 101/12*     (2006.01)
    *B29K 105/04*     (2006.01)
    *B29K 105/08*     (2006.01)
    *B29K 105/12*     (2006.01)
    *B29K 705/12*     (2006.01)

(52) U.S. Cl.
    CPC ...... *B29K 2101/12* (2013.01); *B29K 2105/04* (2013.01); *B29K 2105/0854* (2013.01); *B29K 2105/12* (2013.01); *B29K 2705/12* (2013.01); *B29K 2995/0046* (2013.01)

(58) Field of Classification Search
    CPC .............. B29C 70/465; B29K 2101/12; B29K 2105/04; B29K 2105/0854; B29K 2105/12; B29K 2705/12; B29K 2995/0046; B32B 2262/02; B32B 2262/0253; B32B 2262/0261; B32B 2262/0269; B32B 2262/0276; B32B 2262/101; B32B 2262/106; B32B 2307/50; B32B 2605/08; B32B 2605/18; B32B 5/26; B32B 27/20; B32B 2262/14; B32B 2264/105; B32B 2264/1056; B32B 2605/00; B32B 5/022; B32B 5/024; B32B 5/08; B32B 27/12
    See application file for complete search history.

(56) References Cited

FOREIGN PATENT DOCUMENTS

| | | |
|---|---|---|
| WO | 2006111037 A1 | 10/2006 |
| WO | 2006133586 A1 | 12/2006 |
| WO | 2012101192 A1 | 8/2012 |
| WO | 2015117799 A1 | 8/2015 |

* cited by examiner

METHOD OF MANUFACTURING A LIGHTWEIGHT, STRUCTURALLY REINFORCED OBJECT OF THERMOPLASTIC MATERIAL

CROSS REFERENCE TO RELATED APPLICATIONS

This application is the U.S. National Phase of PCT Appln. No. PCT/EP2020/075819 filed Sep. 16, 2020, which claims priority to European Application No. 19197629.9 filed Sep. 16, 2019, the disclosures of which are incorporated in their entirety by reference herein.

BACKGROUND OF THE INVENTION

1. Field of the Invention

The present invention relates to a novel method of manufacturing a lightweight, structurally reinforced object of thermoplastic material comprising at least one reinforcement zone, and it further relates to such an object.

2. Description of the Related Art

Composite parts made of fiber reinforced thermoplastics are being widely used in many technical fields.

For example, WO 2015/117799A1 discloses a composite part comprising a foam core that has a first and second skin layer which are bonded to the foam core on a first surface and a second surface thereof, respectively. Similarly, WO 2006/133586 discloses a flexurally rigid composite sheet comprising one or two skin layers with a thickness of 0.5 to 5 mm made of glass-fiber reinforced polypropylene with a glass content of 20 to 60 wt.-% and an air voids content of less than 5 vol-%, and a core layer with a thickness of 2 to 40 mm made of glass-fiber reinforced polypropylene with a glass content of 35 to 80 wt.-% and an air voids content of 20 to 80 vol-%. Such porous core sheets can be formed by dry blending of polypropylene fibers and glass fibers, needling of the blended nonwoven, and heat pressing, as extensively described in WO 2006/105682 A1. On the other hand, various types of fiber reinforced thermoplastic materials useful as skin layers or other reinforcement zones are known. In particular, WO 2006/111037 A1 discloses a thermoplastically processable sheet-like composite material consisting of (A) at least one nonwoven layer comprising 10 to 100 wt.-% thermoplastic fibers and (B) at least one woven fabric of reinforcing fibers, wherein the two layers A and B are needled together.

EP 0148763 A2 discloses a process for producing moulded fiber reinforced plastics articles. The process involves pre-heating a sheet of thermoplastics material reinforced with glass fibers and introducing the pre-heated sheet into a mould and subjecting the material to pressure.

The above cited prior art addresses the general task of optimizing mechanical properties while keeping the weight as small as possible. However, an additional challenge arises when structurally reinforced objects shall be produced with a shape which is more complex than a simple planar sheet or board, e.g. having reinforcement ribs that protrude from the basic plane of the object. Notable examples are objects having a T-type or H-type cross section, but also more complex objects with variable cross section.

SUMMARY OF THE INVENTION

According to the invention, there is provided a method of method of manufacturing a lightweight, structurally reinforced object of thermoplastic material comprising at least one reinforcement zone, the method comprising the following steps:

a) providing a heatable rigid forming chamber comprising a chamber volume V surrounded by chamber walls and an openable chamber lid;

b) providing a plurality of thermoplastic lofting bodies and a plurality of thermoplastic reinforcement bodies, the lofting bodies and the reinforcement bodies comprising identical or mutually compatible thermoplastic material, the reinforcement bodies further comprising reinforcement fibers embedded in the thermoplastic material, the lofting bodies being
  i) heat-loftable bodies comprising a thermoplastic matrix containing an elastically compressed assembly of reinforcement fibers embedded therein, and/or
  ii) lofty non-woven bodies comprising an elastically compressible assembly of reinforcement fibers and thermoplastic fibers;

and optionally providing a plurality of rigid filler bodies;

c) at a base temperature below a thermoplastic softening temperature, loading the chamber with lofting bodies, reinforcement bodies, and optionally with filler bodies, so as to form an arrangement corresponding to the intended object, wherein the lofting bodies have an initial first volume $V1$, the reinforcement bodies have an initial second volume $V2$, and the filler bodies have an initial third volume $V3$, and wherein the sum $V0=V1+V2+V3$ of said initial first, second and third volumes exceeds the chamber volume V by an excess volume $Ve$ which is in the range from 0.5 to 0.95 times the initial first volume of any lofting bodies which are lofty non-woven bodies (ii);

d) closing the chamber lid, whereby the lofting bodies assume a loaded first volume $V1'$, the reinforcement bodies assume a loaded second volume $V2'$, and the filler bodies assume a loaded third volume $V3'$ substantially equal to the initial third volume $V3$, and whereby the sum $V0'=V1'+V2'+V3'$ of said loaded first, second and third volumes is equal to the chamber volume V, whereby any lofting bodies configured as lofty non-woven bodies are elastically compressed, thereby building up a first amount of internal pressure;

e) heating up the chamber to a processing temperature above said thermoplastic softening temperature, whereby the reinforcement bodies and the lofting bodies are brought into a thermoplastically formable state, and whereby any lofting bodies configured as heat-loftable bodies are caused to build up a second amount of internal pressure;

f) after a predetermined processing time, allowing the chamber to cool down, whereby the reinforcement bodies and the lofting bodies solidify, followed by removing any filler bodies, thereby obtaining said structurally reinforced object.

DETAILED DESCRIPTION OF THE PREFERRED EMBODIMENTS

According to another aspect of the invention, there is provided a lightweight, structurally reinforced object of thermoplastic material comprising at least one reinforcement zone and obtainable by the above defined method, wherein the reinforcement zone has a sheet-like shape, optionally comprising at least one folding edge, and wherein each reinforcement zone is at least partially embedded in a zone of porous thermoplastic material. Such lightweight, structurally reinforced objects are particularly useful in the automotive and aerospace domains. Examples are reinforced floor panels and confinement plates. By virtue of the manufacturing method, such parts can be formed with various non-planar shapes. In particular, it is possible to produce parts that are formed around a given structural element.

The present invention relies on the use of thermoplastic lofting bodies, which shall be understood as bodies made of a thermoplastic material and having a tendency to expand ("loft") upon heating. Two fundamentally different types of lofting bodies can be used for the present invention:

i) Heat-loftable bodies comprising a thermoplastic matrix containing an elastically compressed assembly of reinforcement fibers embedded therein. Typically, the reinforcement fibers are brought into a compressed or pre-stressed state by a mechanical treatment such as needling or water jet treatment and are "frozen" into a thermoplastic matrix. When heated above the thermoplastic softening temperature, the fibers are no longer trapped and tend to expand. This phenomenon is known as "lofting".

ii) Lofty non-woven bodies comprising an elastically compressible assembly of reinforcement fibers and thermoplastic fibers. Such assemblies are provided in a very lightweight state and typically have a volume of at least 5 times, typically 10 times and up to 20 times the volume of a densely packed fiber assembly.

In principle, one could carry out the manufacturing method using both types of thermoplastic lofting bodies. In practice, it will be preferable to use a single type.

The thermoplastic lofting bodies are used primarily for the purpose of building up or maintaining an internal pressure in step e). In addition, they also serve to form comparatively light-weight regions in the final object.

The invention further relies on the use of thermoplastic reinforcement bodies comprising reinforcement fibers embedded in a thermoplastic material. The reinforcement bodies are provided for forming comparatively high strength regions in the final product.

The lofting bodies and the reinforcement bodies preferably comprise the same thermoplastic polymer, although it is possible to use different, but in any case, compatible, thermoplastic polymers with very similar thermoplastic softening temperatures.

Rigid filler bodies are provided optionally to define regions within the chamber volume from which the thermoplastic lofting and reinforcement bodies shall be excluded. Accordingly, the filler bodies contribute in defining the shape of the final object. In addition, the filler bodies provide rigid structures against which the neighboring thermoplastic bodies can be compressed by action of internal pressure. As the filler bodies are an optional feature, it shall be understood that when being mentioned in subsequent text sections, they are referred to for the case of their presence only.

As will be understood, the present invention relies on using a comparatively simple forming chamber. The chamber must be heatable and have rigid chamber walls, including side walls, bottom and top walls. While the chamber shall have closure means allowing to apply a moderate mechanical pressure during the closing step d). As will be outlined further below, such pressure is needed to compress initially loaded thermoplastic lofting bodies made from a flexible fleece mat. However, the forming chamber does not need to work as a high-pressure mold having walls that are moveable at high temperature. This comparatively simple configuration furthermore provides high versatility, particularly when exploiting various types and shapes of rigid filler bodies.

Advantageous embodiments are defined in the dependent claims.

According to a first embodiment (claim 2), the thermoplastic lofting bodies are configured as heat-loftable bodies containing 20 to 80 wt. % of the thermoplastic material and 80 to 20 wt. % of reinforcing fibers having an average length by weight of 10 to 150 mm and a content of air pores of 35 to 65 vol % that are uniformly distributed in the matrix. The reinforcing fibers are mechanically entangled to one another and are present as individual filaments to an extent of more than 80%. Mechanical entanglement of the reinforcing fibers is typically produced by needling, but other methods such as e.g. water jet entanglement can be used.

When using this first type of lofting bodies, i.e. heat-loftable bodies, loading of the forming chamber is done with an excess volume Ve that is substantially zero. In other words, when carrying out the above mentioned step c), the chamber is loaded in such manner that the various bodies placed into it have a total volume substantially identical to the chamber volume V. Accordingly, the sum V0=V1+V2+V3, i.e. the sum of the volumes V1 of the thermoplastic lofting bodies, V2 of the reinforcement bodies, and, if applicable, V3 of the rigid filler bodies, provided for loading into the chamber is substantially equal to the chamber volume V. Accordingly, after closing the chamber lid and before heating up, there is substantially no pressure in the chamber.

The heat-loftable bodies used as thermoplastic lofting bodies for the first embodiment can be formed by dry blending of thermoplastic fibers and reinforcement fibers, mechanical entanglement of the blended nonwoven thus obtained, and heat pressing, as extensively described in WO 2006/105682 A1. This type of material is well known as various semifinished products commercially available as strips or boards with a width of preferably 300 to 2300 mm, e.g. SymaLITE of Mitsubishi Chemical Advanced Materials, SEEBERLITE of Röchling Automotive AG, ACOUSTIMAX of Owens Corning Corp., SUPERLITE of Azdel Inc. and KARAMTEC of Karam Tech Co. These semifinished products generally have a thickness of 0.5 to 10 mm, preferably 1 to 5 mm, before expansion. Upon heating to temperatures above the softening point of the thermoplastic material without any constraining chamber walls, the semifinished product expands to more than double, preferably more than three to ten times its original thickness due to the restoring force of the fibers.

For this first embodiment, it is advantageous (claim 3) if the initial first volume V1 of the thermoplastic lofting bodies loaded in step c) is 10 to 90% of the sum V1+V2 of the initial volumes of all thermoplastic bodies loaded in step c). A lower than 10% content of thermoplastic lofting bodies would not allow building up a sufficient internal pressure in the forming chamber, whereas a higher than 90% content would excessively limit the amount of reinforcement bodies providing mechanical stability of the structurally reinforced object to be produced.

According to a second embodiment (claim 3), the thermoplastic lofting bodies are configured as lofty non-woven bodies each comprising at least one layer of a flexible fleece mat containing 10 to 90 wt. % fibers of the thermoplastic material and 0 to 90 wt. % reinforcing fibers and having an areal weight of 300 to 3'000 g/m$^2$. Such fleece mats are widely used in manifold technical areas, particularly for producing lightweight form parts with advantageous structural properties. They are typically produced with well established carding or air-laying technologies and are basically formed as sheets.

When using this second type of lofting bodies, i.e. lofty non-woven bodies, loading of the forming chamber is done with a substantial excess volume Ve lying in the range of 0.5×V1 to 0.95×V1, preferably in the range of 0.6×V1 to 0.9×V1. In other words, up to 95% of the initial volume of the thermoplastic lofting bodies constitutes excess volume Ve which will be compressively reduced upon closing of the chamber. Stated differently, the initial first volume V1 of the thermoplastic lofting bodies provided for loading into the chamber is up to 20 times larger, particularly up to 10 times larger than their volume V1' after being loaded into the chamber and closing the latter.

For this second embodiment, it is advantageous (claim 5) if the initial first volume V1 of the thermoplastic lofting bodies loaded in step c) is 1 to 100 times the second initial volume V2 of the reinforcement bodies loaded in step c).

If both types (i) and (ii) of lofting bodies are used, the amount of excess volume Ve will be determined by the initial volume of those lofting bodies which are of the second type, i.e. lofty non-woven bodies.

In principle, the thermoplastic reinforcement bodies could be a suitable portion of a basically known glass-mat-reinforced thermoplastic sheet (GMT).

According to a particularly advantageous embodiment (claim 6), the thermoplastic reinforcement bodies consist of:
A. at least one nonwoven layer comprising 10 to 100 wt.-% thermoplastic fibers and 0 to 90 wt.-% reinforcing fibers with an areal weight of 200 to 2'000 g/m$^2$ and
B. at least one woven fabric, non-crimp fabric or unidirectional assembly of reinforcing fibers with an areal weight of 100 to 1'000 g/m$^2$ wherein the layers A and B are needled together.

Such layered thermoplastic reinforcement bodies have been extensively described in WO 2006/111037 A1. They are commercially available, for example as "Q-Tex" from Mitsubishi Chemical Advanced Materials.

Depending on the intended purpose of use, at least some of the thermoplastic reinforcement bodies are loaded in a folded state having at least one folding edge (claim 7). In the present context, a "folding edge" shall be understood as the region of an object where two mutually connected, non-coplanar regions intersect. In practice, thermoplastic reinforcement bodies with such folding edges are particularly useful for producing objects having a T-type or H-type cross section.

According to another advantageous embodiment (claim 8), in the arrangement formed in step c), the chamber walls and the optional filler bodies are in contact with a reinforcement body. In other words, the chamber is loaded in such manner that the various thermoplastic lofting bodies are not in direct contact with the chamber walls and filler bodies, but rather are separated therefrom by a reinforcement body.

If the method of this invention is carried out using at least one filler body, there are various advantageous embodiments.

According to one such embodiment (claim 9), each filler body is removable from the arrangement obtained after cooling down the chamber by pulling. In simple terms this means that any of the filler bodies loaded into the chamber will have at least one part in direct proximity of a chamber wall and will have a sufficiently simple shape so as to be removable in step g) without the need of making any clearance cuts into the cooled down material. Notable examples are filler bodies having the shape of a straight bar which can be extracted along its longitudinal axis by pulling.

In another embodiment (claim 10), at least one filler body is configured as an assembly of components which are releasably connected with each other. In this manner, one can build up a filler body with a variety of complex shapes. For example, one may assemble a frame like structure by connecting four bar-shaped components. While one could use some kind of plug-in or snap-in connection, it is particularly advantageous to adopt a threaded connection. In order to properly work under operational conditions of heating up and cooling down, appropriate lubrication of threaded parts is required.

In principle, the filler bodies could be made of any material which is sufficiently rigid and can withstand the heating process applied to the chamber. According to an advantageous embodiment (claim 11), the filler bodies are made of metal, preferably stainless steel.

According to yet another embodiment (claim 12), the filler bodies are actively heatable. In particular, the filler bodies may be heatable by induction. As generally known, this implies an appropriate material selection, i.e. the filler bodies should consist of a material with good electrical conductivity.

As known in the field of fiber reinforced thermoplastics, the reinforcement fibers can be selected from a large variety. Advantageously (claim 13) the reinforcement fibers are selected from glass fibers, carbon fibers, aramid fibers, basalt fibers and natural fibers. Alternatively, the reinforcement fibers may be made of a high-melting thermoplastic, i.e. from a material that does not melt at the processing temperatures of the heating step e).

Similarly, the thermoplastic material can be selected from a variety of known polymers. Advantageously (claim 14), it is selected from polypropylene (PP), polyetherimide (PEI), polysulfone (PSU), polyethersulfone (PES), polyphenylenesulfone (PPSU), polyphthalamide (PPA), polyphenylenether (PPO), polyetheretherketone (PEEK) polyphenylene sulfide (PPS), polyamide (PA), polyaryletherketone (PAEK), polyetherketoneketone (PEKK) and polycarbonate (PC).

In many advantageous embodiments, particularly for automotive industry, the reinforcement fibers are glass fibers and the thermoplastic material is PP, preferably a polypropylene with a melt flow index MFI (230° C., 2.16 kg) of 5 to 500, preferably of 10— to 200 g/10 min. In further embodiments, carbon fibers are used together with PA. In aerospace industry, the thermoplastic polymer is advantageously selected from PEI, PEEK, PAEK and PEKK.

The above mentioned and other features and objects of this invention and the manner of achieving them will become more apparent and this invention itself will be better understood by reference to the following description of various embodiments of this invention taken in conjunction with the accompanying drawings, wherein:

It will be understood that the figures are not necessarily drawn to scale. In some instances, relative dimensions are substantially distorted for ease of visualization. Identical or corresponding features in the various figures will generally be denoted with the same reference numerals.

The basic principle of the invention is illustrated in FIGS. 1 and 2 showing two embodiments each exemplified for a particularly simple case ("A-B-A sandwich"). Only to further simplify the explanation, the principle of lofting will not be discussed in terms of volume V, but rather in terms of a single thickness dimension D depicted in horizontal direction.

Just for illustration purposes, the material of thermoplastic lofting bodies is shown with a hatched texture when in a cold state and with a fully red colored texture when in a hot state above the thermoplastic softening temperature.

A rigid forming chamber generally indicated as 2 is defined by chamber walls, of which are shown a bottom wall 4, a top wall 6 a left wall 8 and a right wall 10. Two further chamber walls, namely a front wall and a back wall are not shown. At least one of these walls, e.g. the top wall 6, is configured as an openable chamber lid. The forming chamber is shown in a disassembled state in FIGS. 1a and 2a, whereas it is in an assembled and closed state in FIGS. 1b, 1c and 2b, 2c.

Figures 1A, 1B, 1C:
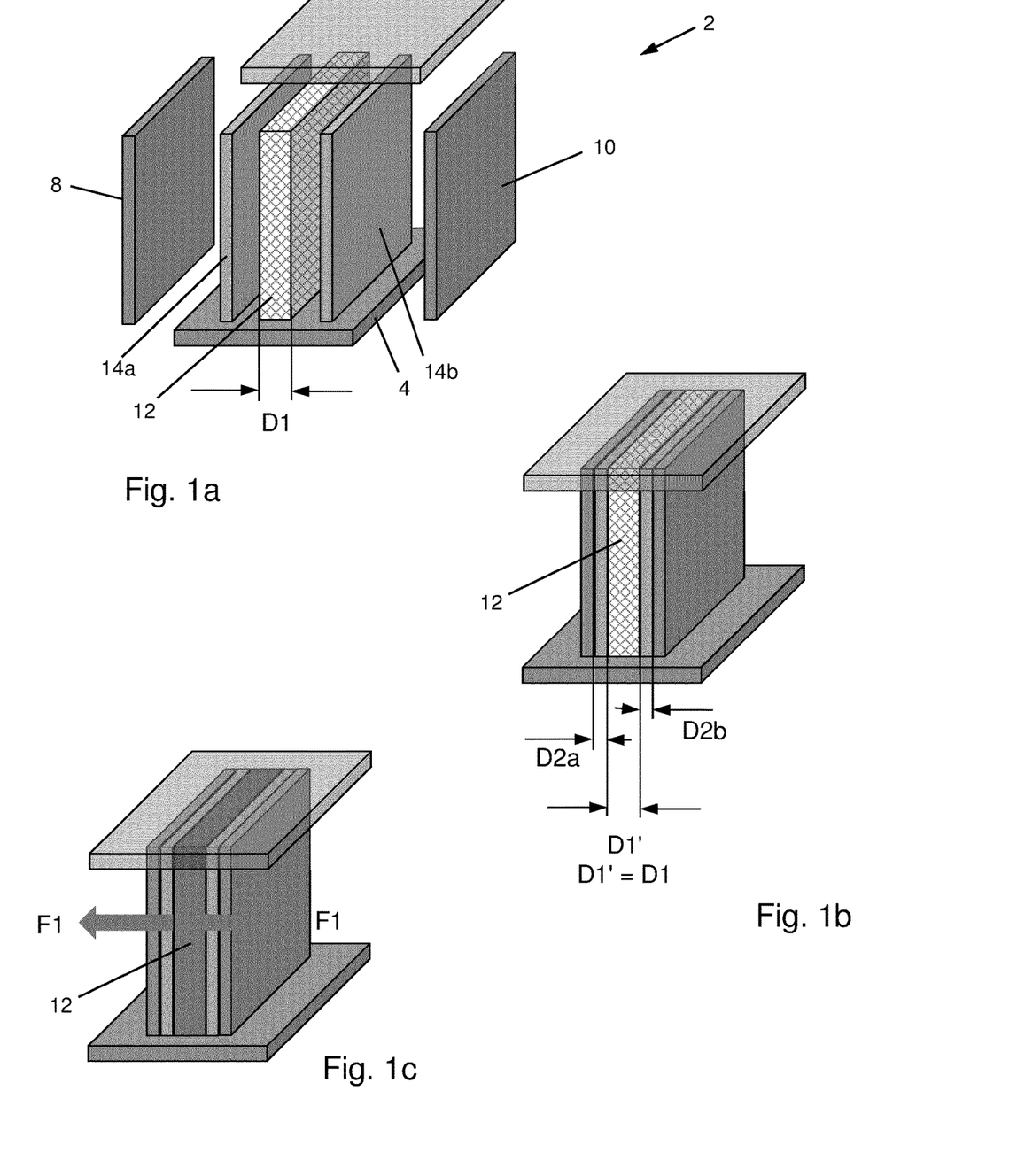
FIG. 1 shows key steps of the manufacturing process according to a first embodiment, in a schematic perspective view.

The first embodiment illustrated in FIGS. 1a to 1c relies on using thermoplastic lofting bodies which are heat-loftable. As shown in FIG. 1a, a plate 12 of heat-loftable material having a thickness D1 is loaded into chamber 2 sandwiched between a pair of thermoplastic reinforcement bodies 14a, 14b configured as plates having a thickness D2a and D2b (only shown in FIG. 1b for reasons of space), respectively. Accordingly, the total thickness of the thermoplastic reinforcement bodies is D2=D2a+D2b. The situation after this loading step is shown in FIG. 1b. Assuming that all of the loaded bodies have the same plane area A, which also corresponds to the area of each inner face of lateral walls 8 and 10, the following initial volumes result:

initial first volume of thermoplastic lofting body:

$$V1=A \times D1$$

initial second volume of thermoplastic reinforcement bodies:

$$V2=A \times (D2a+D2b)$$

No rigid filler bodies are considered in this example, so the initial third volume V3 is zero.

Accordingly, one has the following initial total volume V0:

$$V0=V1+V2=A \times (D1+D2a+D2b)$$

In this first embodiment, the size of the various bodies loaded into the chamber just matches the chamber size, i.e. V0=V, and accordingly the excess volume Ve, which is defined as Ve=V−V0 is zero. As a consequence, the chamber can be closed without compressing any of the loaded bodies. In particular, the loaded first volume V1' of the thermoplastic lofting bodies is equal to V1, and the loaded second volume V2' of the thermoplastic reinforcement bodies V2' is equal to V2.

The situation prevailing during the heating step is then shown in FIG. 1c. Above the thermoplastic softening temperature, the thermoplastic lofting bodies generate an internal pressure which in the simple case shown produces an outward directed force F1. This leads to some rearrangement of flowable thermoplastic material into residual cavities present in the assembly of loaded bodies. Depending on the amount of compressibility of the thermoplastic reinforcement bodies, the internal pressure leads to a certain expansion of the lofting bodies, which will assume a processed first volume V1" that is somewhat larger than V1'. This change is accompanied by a corresponding shrinkage of the reinforcement bodies, which will assume a processed second volume V2". This internally pressurized heating followed by a final cooling step leads to consolidation of the thermoplastic reinforcement bodies and to bonding between adjacent faces of the thermoplastic lofting bodies and thermoplastic reinforcement bodies.

Figures 2A, 2B, 2C:
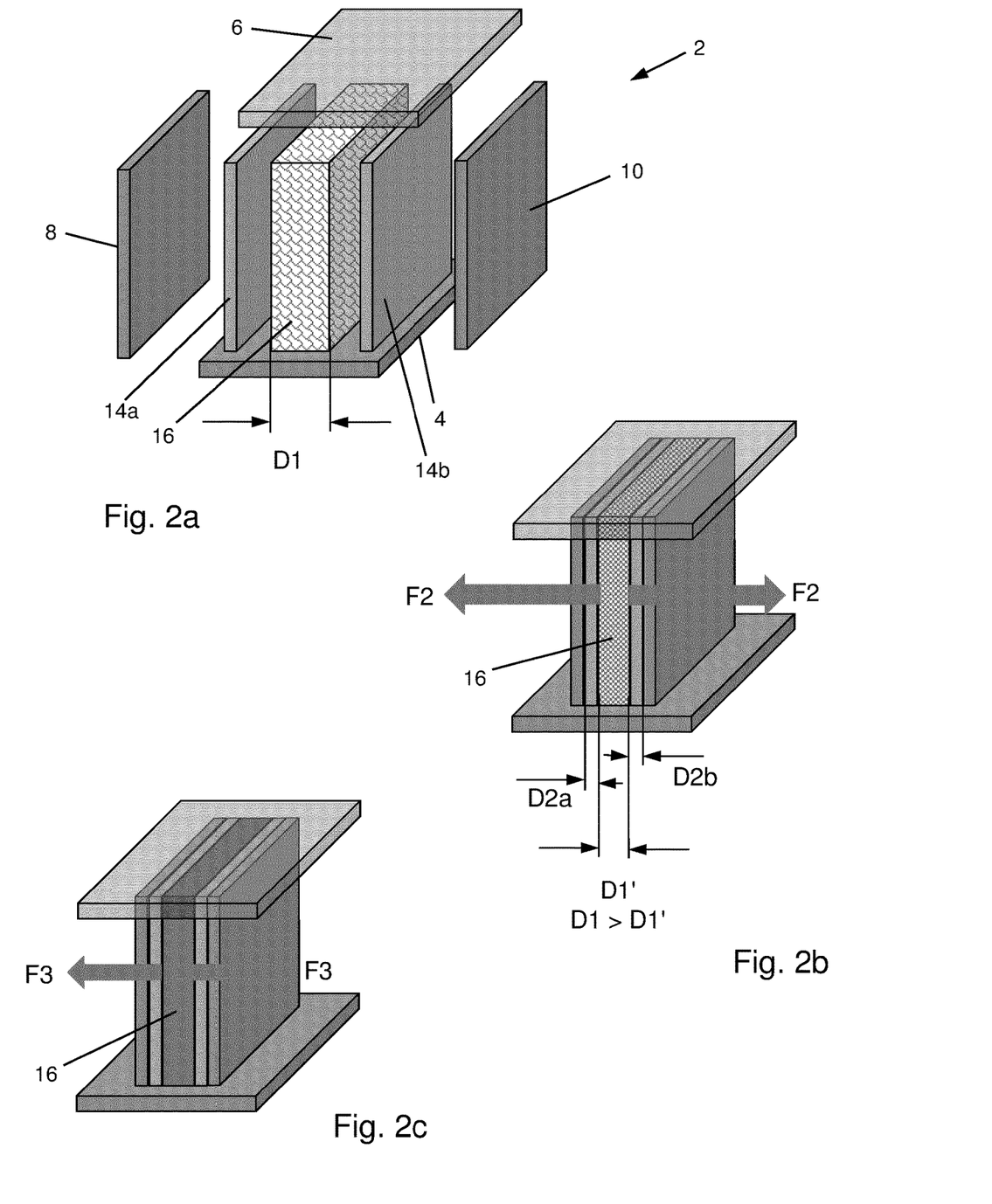
FIG. 2 shows key steps of the manufacturing process according to a second embodiment, in a schematic perspective view.

The second embodiment illustrated in FIGS. 2a to 2c relies on using thermoplastic lofting bodies which are lofty non-woven bodies. As shown in FIG. 2a, a plate 16 of such lofty material having a thickness D1 is loaded into chamber 2 sandwiched between a pair of thermoplastic reinforcement bodies 14a, 14b configured as plates having a thickness D2a and D2b, respectively (only shown in FIG. 2b for reasons of space).

As in the first example, no rigid filler bodies are considered, so the initial third volume V3 is zero. Accordingly, one has again the following initial total volume V0:

$$V0=V1+V2+V3=A \times (D1+D2a+D2b)$$

In contrast to the this first embodiment, the size of the bodies loaded into the chamber substantially exceeds the chamber size, i.e. V0=V+Ve. The excess volume stems from the thickness of the lofty material used for the thermoplastic lofting bodies, and it can be as high as 0.95 V1.

Closing of the chamber will compress the lofty material by as much as a factor of 20, thus requiring a compression with up to about 10 bar. This means that after closing the chamber and before heating up, the thermoplastic lofting bodies generate an internal pressure which in the simple case shown produces an outward directed force F2, see FIG. 2b.

The situation prevailing during the heating step is then shown in FIG. 2c. The internal pressure caused by the compression of the lofty material prevails, although it is generally found to be somewhat lower than in the cold chamber, so that the outward directed force F3 is somewhat smaller than F2. Nevertheless, like in the first embodiment, the internal pressure leads to some rearrangement of flowable thermoplastic material into residual cavities present in the assembly of loaded bodies. Depending on the amount of compressibility of the thermoplastic reinforcement bodies, the internal pressure leads to a certain expansion of the lofting bodies, which will assume a processed first volume V1" that is somewhat larger than V1'. This change is accompanied by a corresponding shrinkage of the reinforcement bodies, which will assume a processed second volume V2". This internally pressurized heating followed by a final cooling step leads to consolidation of the thermoplastic reinforcement bodies and to bonding between adjacent faces of the thermoplastic lofting bodies and thermoplastic reinforcement bodies.

Figure 3:
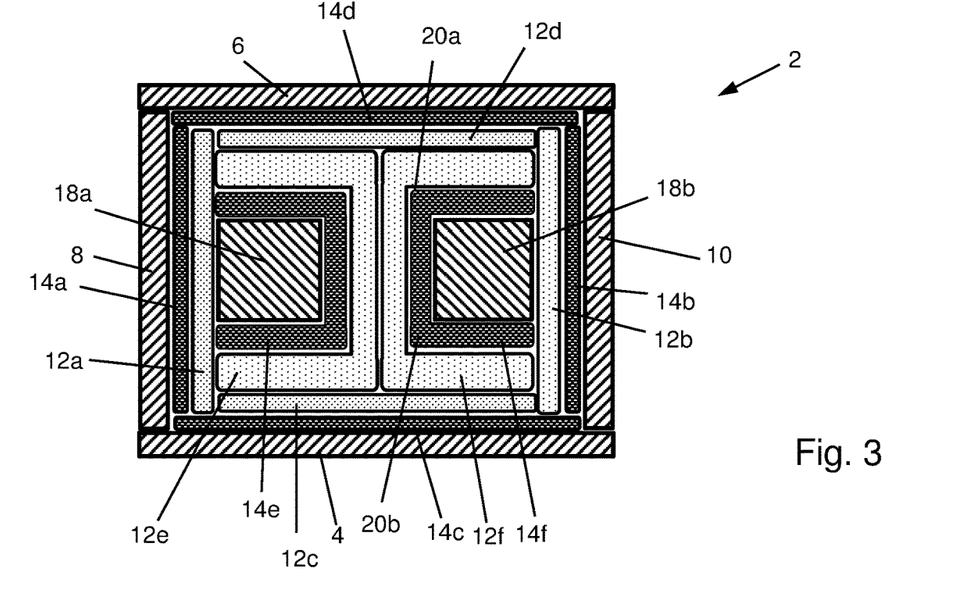
FIG. 3 shows a chamber loaded with thermoplastic lofting bodies, thermoplastic reinforcement bodies and rigid filler bodies, in a sectional view.

In practice, particularly when forming objects with more complex structures than the simple A-B-A type sandwiches discussed above, the selection of sizes and shapes of the various bodies loaded into the chamber will require some judicious choice. This is illustrated in FIG. 3, wherein a rigid forming chamber is shown loaded as follows: adjacent each chamber wall there is a thermoplastic reinforcement body 14a, 14b, 14c and 14d, which will form an outer face of the final object to be produced. The chamber furthermore contains two rigid filler bodies 18a and 18b, which define a cavity region of the final object. In this case, each filler body has the shape of a square bar. Depending on size, the rigid filler body is a thick-walled hollow body. Two further reinforcement bodies 14e and 14f with substantially C-shaped cross section each having an upper folding edge 20a and a lower folding edge 20b are located around the rigid filler bodies. Moreover, the chamber is loaded with substantially plate-shaped thermoplastic lofting bodies 12a, 12b, 12c and 12d and with substantially C-shaped thermoplastic lofting bodies 12e and 12f, each surrounding an adjacent C-shaped reinforcement body.

Figure 4:
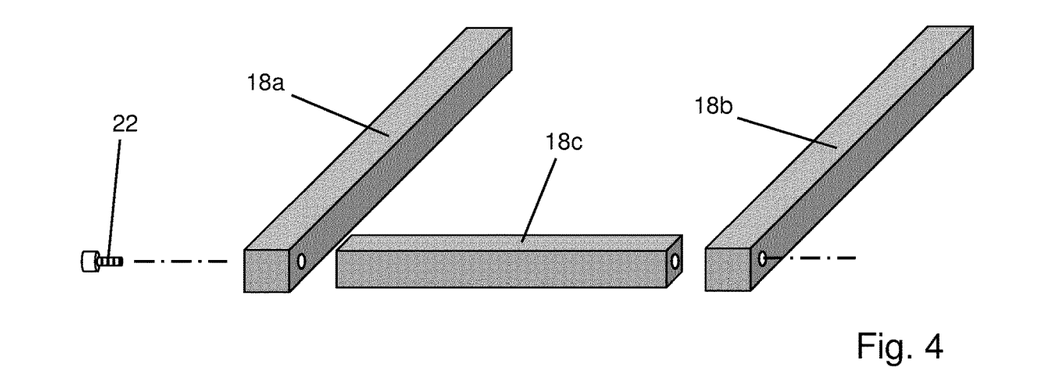
FIG. 4 shows part of an assembly of a frame-like filler body, in a disassembled state, in a perspective view.

The rigid filler bodies 18a and 18b may be part of a kit as the one partially shown in FIG. 4. Various bar shaped filler bodies 18a, 18b and 18c may be assembled with suitable connection means such as the schematically indicated threaded bolt 22.

Figure 5A:
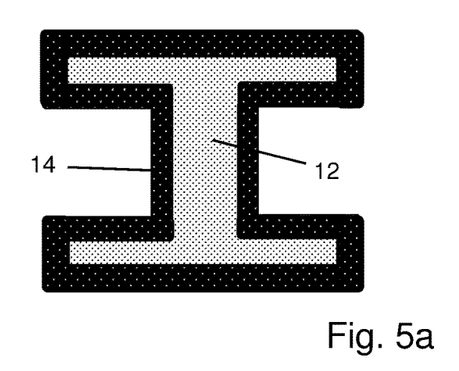
FIG. 5 shows examples of lightweight, structurally reinforced objects of thermoplastic material configured as (a) an H-type structure, (b) a multilayered tube, in a sectional view.
Figure 5B:
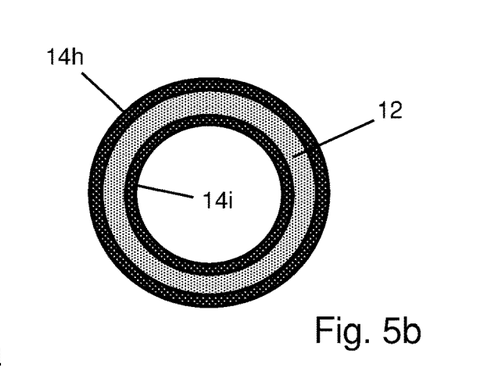

Two examples of lightweight structurally reinforced objects of thermoplastic material are shown in FIG. 5. The H-type profiled object of FIG. 5a has a core 12 of lightweight thermoplastic material resulting from initially provided thermoplastic lofting bodies, which is completely surrounded by a skin-like reinforcement zone 14 resulting from initially provided thermoplastic reinforcement bodies. In contrast, FIG. 5b shows a lightweight structurally reinforced tube having an outer reinforcement zone 14h and an inner reinforcement zone 14i enclosing an inner zone 12 of lightweight thermoplastic material.

Figure 6A:
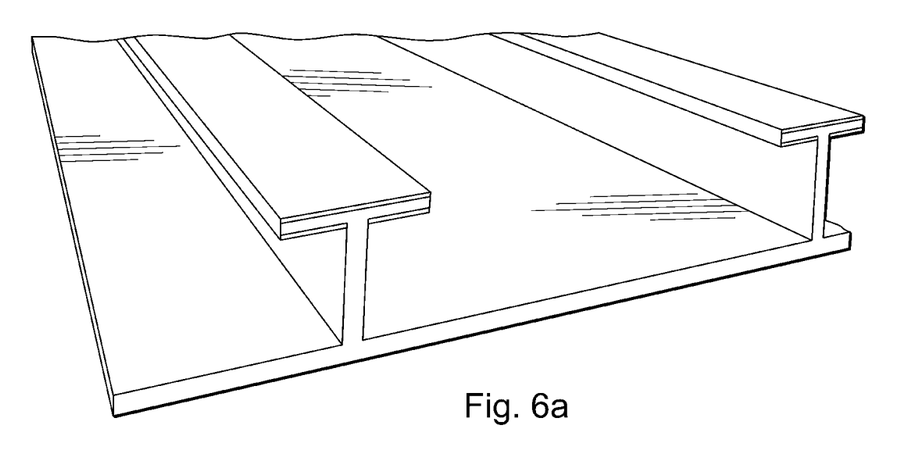
FIG. 6 shows a complex shaped lightweight, structurally reinforced object of thermoplastic material (a) from a first side, (b) from a second, opposite side, as photographic representations.
Figure 6B:
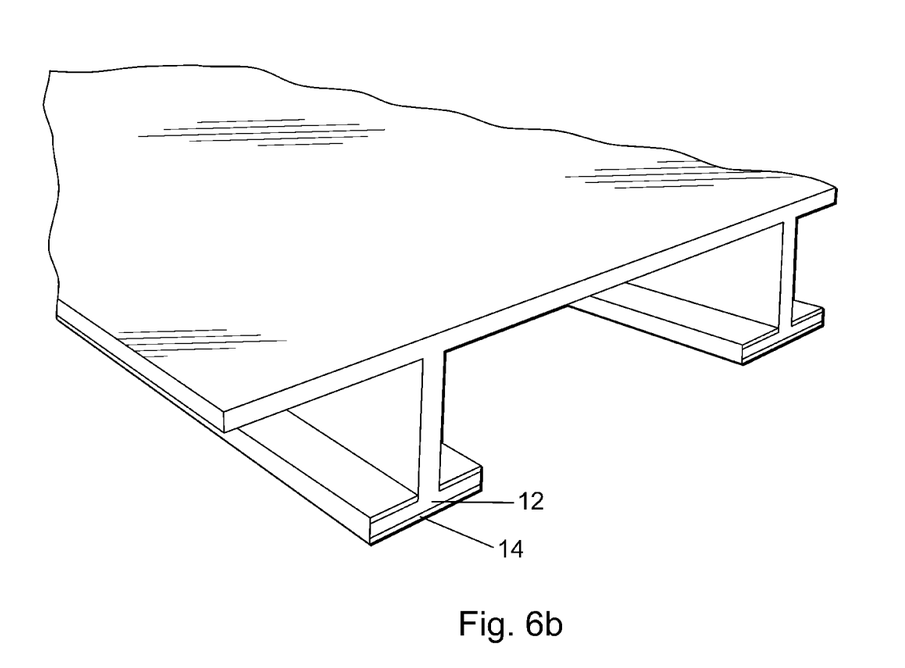

Finally, FIG. 6 shows a further example of a lightweight structurally reinforced object obtained according to the present invention. The object comprises a board-shaped principal part onto which are integrally formed two T-shaped reinforcement ribs. The structure visible in the cross sectional cut perpendicular to the board plane one can see external reinforcement zones 14 with a smooth appearance just faintly showing a structure due to a reinforcement web structure. Moreover, one can see a slightly porous inner zone 12 embedded within the reinforcement zones.

The invention claimed is:

1. A method of manufacturing a lightweight, structurally reinforced object of thermoplastic material comprising at least one reinforcement zone, the method comprising the following steps:
   a) providing a heatable rigid forming chamber comprising a chamber volume surrounded by chamber walls and an openable chamber lid;
   b) providing a plurality of thermoplastic lofting bodies and a plurality of thermoplastic reinforcement bodies, the lofting bodies and the reinforcement bodies comprising identical or mutually compatible thermoplastic material, the reinforcement bodies further comprising reinforcement fibers embedded in the thermoplastic material, the lofting bodies being
   i) heat-loftable bodies comprising a thermoplastic matrix containing an elastically compressed assembly of reinforcement fibers embedded therein,
   and/or
   ii) lofty non-woven bodies comprising an elastically compressible assembly of reinforcement fibers and thermoplastic fibers;
   and optionally providing a plurality of rigid filler bodies;
   c) at a base temperature below a thermoplastic softening temperature, loading the chamber with lofting bodies, reinforcement bodies, and optionally with filler bodies, so as to form an arrangement corresponding to the intended object, wherein the lofting bodies have an initial first volume V1, the reinforcement bodies have an initial second volume V2, and the filler bodies have an initial third volume V3, and wherein the sum V0=V1+V2+V3 of said initial first, second and third volumes exceeds the chamber volume V by an excess volume Ve which is in the range from 0.5 to 0.95-times the initial first volume of any lofting bodies which are lofty non-woven bodies (ii);
   d) closing the chamber lid, whereby the lofting bodies assume a loaded first volume V1', the reinforcement bodies assume a loaded second volume V2', and the filler bodies assume a loaded third volume V3' substantially equal to the initial third volume V3, and whereby the sum V0'=V1'+V2'+V3' of said loaded first, second and third volumes is equal to the chamber volume V, whereby any lofting bodies configured as lofty non-woven bodies are elastically compressed, thereby building up a first amount of internal pressure;
   e) heating up the chamber to a processing temperature above said thermoplastic softening temperature, whereby the reinforcement bodies and the lofting bodies are brought into a thermoplastically formable state, and whereby any lofting bodies configured as heat-loftable bodies are caused to build up a second amount of internal pressure;
   f) after a predetermined processing time, allowing the chamber to cool down, whereby the reinforcement bodies and the lofting bodies solidify, followed by removing any filler bodies, thereby obtaining said structurally reinforced object.

2. The method of claim 1, wherein the thermoplastic lofting bodies are heat-loftable bodies containing 20 to 80 wt. % of the thermoplastic material and 80 to 20 wt. % of reinforcing fibers having an average length by weight of 10 to 150 mm and a content of air pores of 35 to 65 vol % that are uniformly distributed in the matrix, the reinforcing fibers being mechanically entangled to one another and being present as individual filaments to an extent of more than 80%, and wherein the excess volume Ve is substantially zero.

3. The method of claim 2, wherein the initial first volume V1 of the thermoplastic lofting bodies loaded in step c) is 10 to 90% of the sum V1+V2 of the initial volumes of all thermoplastic bodies loaded in step c).

4. The method of claim 1, wherein the thermoplastic lofting bodies are lofty non-woven bodies comprising at least one layer of a flexible fleece mat containing 10 to 90 wt. % fibers of the thermoplastic material and 0 to 90 wt. % reinforcing fibers and having an areal weight of 200 to 3000 g/m², and wherein the excess volume Ve is in the range of 0.5 to 0.95.

5. The method of claim 4, wherein the initial first volume V1 of the thermoplastic lofting bodies loaded in step c) is 1 to 100 times the second initial volume V2 of the reinforcement bodies loaded in step c).

6. The method of claim 1, wherein the thermoplastic reinforcement bodies consist of:
   A. at least one nonwoven layer comprising 10 to 100 wt.-% thermoplastic fibers and 0 to 90 wt.-% reinforcing fibers with an areal weight of 200 to 2000 g/m² and B. at least one woven fabric, non-crimp fabric or unidirectional assembly of reinforcing fibers with an areal weight of 100 to 1000 g/m² wherein the layers A and B are needled together.

7. The method of claim 1, wherein at least one of the thermoplastic reinforcement bodies is loaded in a folded state having at least one folding edge (20a, 20b).

8. The method of claim 1, wherein, in the arrangement formed in step c), the chamber walls and the optional filler bodies are in contact with a reinforcement body.

9. The method of claim 1, wherein each filler body is removable by pulling.

10. The method of claim 1, wherein at least one filler body is configured as an assembly of components which are releasably connected with each other.

11. The method of claim 1, wherein the filler bodies are made of metal.

12. The method of claim 1, wherein the filler bodies are made of stainless steel.

13. The method of claim 1, wherein the filler bodies are actively heatable.

14. The method of claim 1, wherein the reinforcement fibers are selected from the group consisting of glass fibers, carbon fibers, aramid fibers, basalt fibers, natural fibers, high-melting thermoplastic fibers, and mixtures thereof.

15. The method of claim 1, wherein said thermoplastic material is selected from the group consisting of PP, PEI, PES, PSU, PPSU, PPA, PPO, PEEK, PPS, PA, PEAK, PEKK, PC, and mixtures thereof.

16. The method of claim 1, wherein the reinforcement zone has a sheet-like shape, optionally comprising at least one folding edge, and wherein each reinforcement zone is at least partially embedded in a zone of porous thermoplastic material.

* * * * *